United States Patent
Sato

(10) Patent No.: US 8,681,511 B2
(45) Date of Patent: Mar. 25, 2014

(54) ALTERNATING CURRENT-DIRECT CURRENT CONVERTER DEVICE

(75) Inventor: Shinji Sato, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 150 days.

(21) Appl. No.: 12/949,423

(22) Filed: Nov. 18, 2010

(65) Prior Publication Data

US 2011/0157938 A1    Jun. 30, 2011

(30) Foreign Application Priority Data

Dec. 28, 2009    (JP) .................................. 2009-297864

(51) Int. Cl.
    *H02M 3/335* (2006.01)

(52) U.S. Cl.
    USPC .......................................................... 363/16

(58) Field of Classification Search
    USPC ......... 363/34, 37, 123, 125, 127, 129, 15, 16, 363/17, 71, 132
    See application file for complete search history.

(56) References Cited

U.S. PATENT DOCUMENTS

| | | | |
|---|---|---|---|
| 7,026,767 B2 * | 4/2006 | Yang | 363/125 |
| 7,035,125 B2 * | 4/2006 | Yoshida | 363/71 |
| 7,164,589 B1 * | 1/2007 | Soldano et al. | 363/21.04 |
| 7,391,132 B2 * | 6/2008 | Chen | 307/43 |
| 7,746,674 B2 * | 6/2010 | Koch | 363/22 |
| 2002/0136029 A1 * | 9/2002 | Ledenev et al. | 363/16 |
| 2009/0159925 A1 * | 6/2009 | Machida | 257/124 |

FOREIGN PATENT DOCUMENTS

| | | |
|---|---|---|
| JP | 6-245550 | 9/1994 |
| JP | 2002-233155 | 8/2002 |
| JP | 2008-206385 | 9/2008 |

OTHER PUBLICATIONS

Japanese Office Action issued Nov. 29, 2011, in Patent Application No. 2009-297864 (with English-language translation).

* cited by examiner

*Primary Examiner* — Gary L Laxton
*Assistant Examiner* — Alex Torres-Rivera
(74) *Attorney, Agent, or Firm* — Oblon, Spivak, McClelland, Maier & Neustadt, L.L.P.

(57) ABSTRACT

In the present invention, switching circuits connected in middle points of power supply lines of a three-phase alternating-current power supply are switched to cause currents to intermittently flow on primary windings of a transformer, a voltage generated on a secondary winding is rectified and smoothed, and then is outputted to a load. The switching circuits each include: a series circuit including a first primary winding, a bidirectional switch and a second primary winding, which are connected in series in this order; a drive circuit power supply generating circuit generating a direct-current positive voltage and a direct-current negative voltage by use of an alternating-current power supply voltage applied between two ends of the series circuit; and a drive circuit performing on-off drive of the bidirectional switch. A reference potential point of the bidirectional switch is connected to a reference potential point of the drive circuit power supply generating circuit.

2 Claims, 3 Drawing Sheets

ALTERNATING CURRENT-DIRECT CURRENT CONVERTER DEVICE

TECHNICAL FIELD

The present invention relates to an alternating current-direct current (AC-DC) converter device configured to convert alternating-current power into insolated direct-current power. More specifically, the present invention relates to a power supply circuit configured to provide a drive circuit power supply for supplying on-off signals to semiconductor switching elements that constitute a converter to convert alternating-current power into direct-current power.

BACKGROUND ART

A power converter device configured to covert alternating-current power into isolated direct-current power is used as a direct-current power supply for communications, for example. In general, this power converter device is a two-stage converter including a non-isolated power factor improvement circuit and a high frequency isolated DC-DC converter. Meanwhile, there is also disclosed a power converter device simplified in a circuit configuration in which a one-stage converter causes the alternating-current power to flow intermittently at high frequency and converts the alternating-current into the direct-current power.

FIG. 1 is a circuit diagram showing an example of a conventional AC-DC converter device disclosed in Japanese Patent Application Publication No. 2002-233155. The AC-DC converter device shown in FIG. 1 is a one-stage conversion high frequency isolated PWM rectifier, in which a series circuit formed of a bidirectional switch Q10 and a first primary winding 3a of a transformer 3 is connected between an alternating-current terminal (R phase) 2a and an alternating-current terminal (T phase) 2c of a three-phase alternating-current power supply 1. A series circuit formed of a bidirectional switch Q20 and a second primary winding 3b of the transformer 3 is connected between an alternating-current terminal (S phase) 2b and the alternating-current terminal 2a of the three-phase alternating-current power supply 1. A series circuit formed of a bidirectional switch Q30 and a third primary winding 3c of the transformer 3 is connected between the alternating-current terminal 2c and the alternating-current terminal 2b of the three-phase alternating-current power supply 1.

The bidirectional switch Q10 is formed of a series circuit including an insulated gate bipolar transistor (IGBT) Q11 and an IGBT Q12. The bidirectional switch Q20 is formed of a series circuit including an IGBT Q21 and an IGBT Q22. The bidirectional switch Q30 is formed of a series circuit including an IGBT Q31 and an IGBT Q32.

An anode of a direct-current power supply 11a is connected to a cathode of a direct-current power supply 10a, and an anode of the direct-current power supply 10a is connected to gates of the IGBTs Q11 and Q12 via a switch Sa1 in a gate drive circuit 12a. A cathode of the direct-current power supply 11a is connected to the gates of the IGBTs Q11 and Q12 via a switch Sa2 in the gate drive circuit 12a. The cathode of the direct-current power supply 10a and the anode of the direct-current power supply 11a are connected to emitters of the IGBTs Q11 and Q12.

An anode of a direct-current power supply 11b is connected to a cathode of a direct-current power supply 10b, and an anode of the direct-current power supply 10b is connected to gates of the IGBTs Q21 and Q22 via a switch Sb1 in a gate drive circuit 12b. A cathode of the direct-current power supply 11b is connected to the gates of the IGBTs Q21 and Q22 via a switch Sb2 in the gate drive circuit 12b. The cathode of the direct-current power supply 10b and the anode of the direct-current power supply 11b are connected to emitters of the IGBTs Q21 and Q22.

An anode of a direct-current power supply 11c is connected to a cathode of a direct-current power supply 10c, and an anode of the direct-current power supply 10c is connected to gates of the IGBTs Q31 and Q32 via a switch Sc1 in a gate drive circuit 12c. A cathode of the direct-current power supply 11c is connected to the gates of the IGBTs Q31 and Q32 via a switch Sc2 in the gate drive circuit 12c. The cathode of the direct-current power supply 10c and the anode of the direct-current power supply 11c are connected to emitters of the IGBTs Q31 and Q32.

A rectifier 4 rectifies a high-frequency voltage generated on a secondary winding 3d of the transformer 3. A series circuit formed of a smoothing reactor 5 and a smoothing capacitor 8 is connected between two terminals of the rectifier 4. A load 7 is connected to two terminals of the smoothing capacitor 8.

In the thus configured conventional AC-DC converter device shown in FIG. 1, the alternating-current power is inputted from the three-phase alternating-current power supply 1 at a commercial frequency to the bidirectional switches Q10, Q20, and Q30 as well as the primary windings 3a to 3c.

The gate drive circuits 12a to 12c turn the switches Sa1, Sb1, and Sc1 on by use of a control signal from an unillustrated control circuit and turn the bidirectional switches Q10, Q20, and Q30 on by applying anode voltages from the direct-current power supplies 10a to 10c to points between the gates and the emitters of the bidirectional switches Q10, Q20, and Q30. Meanwhile, the gate drive circuits 12a to 12c turn the switches Sa2, Sb2, and Sc2 on and turn the bidirectional switches Q10, Q20, and Q30 off by applying cathode voltages from the direct-current power supplies 11a to 11c.

Specifically, the alternating-current power from the three-phase alternating-current power supply 1 is subjected to high frequency switching by use of the bidirectional switches Q10, Q20, and Q30 whereby a high-frequency voltage having a higher frequency than the commercial frequency is generated on the primary windings 3a to 3c and the secondary winding 3d of the transformer 3. This high-frequency voltage is rectified with the rectifier 4 and smoothed by the smoothing reactor 5 and the smoothing capacitor 8, and the direct-current power is supplied to the load 7.

However, the direct-current power supplies 10a to 10c and 11a to 11c are provided separately from a main circuit. Accordingly, it is not possible to supply the power of the direct current power supply 11a from the main circuit in a non-isolated manner when the alternating-current terminal 2b of the S phase is in the state of the lowest potential. For this reason, the direct-current power is supplied to the gate drive circuits 12a to 12c via an unillustrated separate isolated converter.

In other words, since it is necessary to use the separate isolated converter, the conventional configuration causes an increase in the number of components which leads to complication of the AC-DC converter device.

SUMMARY OF THE INVENTION

An object of the present invention is to provide an AC-DC converter device which is capable of supplying direct-current power by use of non-isolated simple circuits.

The present invention is an alternating current-direct current converter device configured to cause a current to intermittently flow on a primary winding of a transformer by switching a switching circuit connected to a middle point of any of a power supply line of a single-phase alternating-current power supply and each power supply line of a three-phase alternating-current power supply, to rectify and smooth a voltage generated on a secondary winding of the transformer, and to output the voltage to a load, wherein the transformer includes a first primary winding and a second primary winding, the switching circuit includes: a series circuit including the first primary winding of the transformer, a bidirectional switch, and the second primary winding of the transformer which are connected one to another in series in this order; a drive circuit power supply generating circuit which generates a direct-current positive voltage and a direct-current negative voltage by use of an alternating-current power supply voltage applied between two ends of the series circuit; and a drive circuit which is connected between the drive circuit power supply generating circuit and the bidirectional switch, and which performs on-off drive of the bidirectional switch, and a reference potential point of the bidirectional switch is connected to a reference potential point of the drive circuit power supply generating circuit.

DESCRIPTION OF EMBODIMENTS

Now, embodiments of an AC-DC converter device of the present invention will be described below in detail with reference to the accompanying drawings.

First Embodiment

Figure 1:
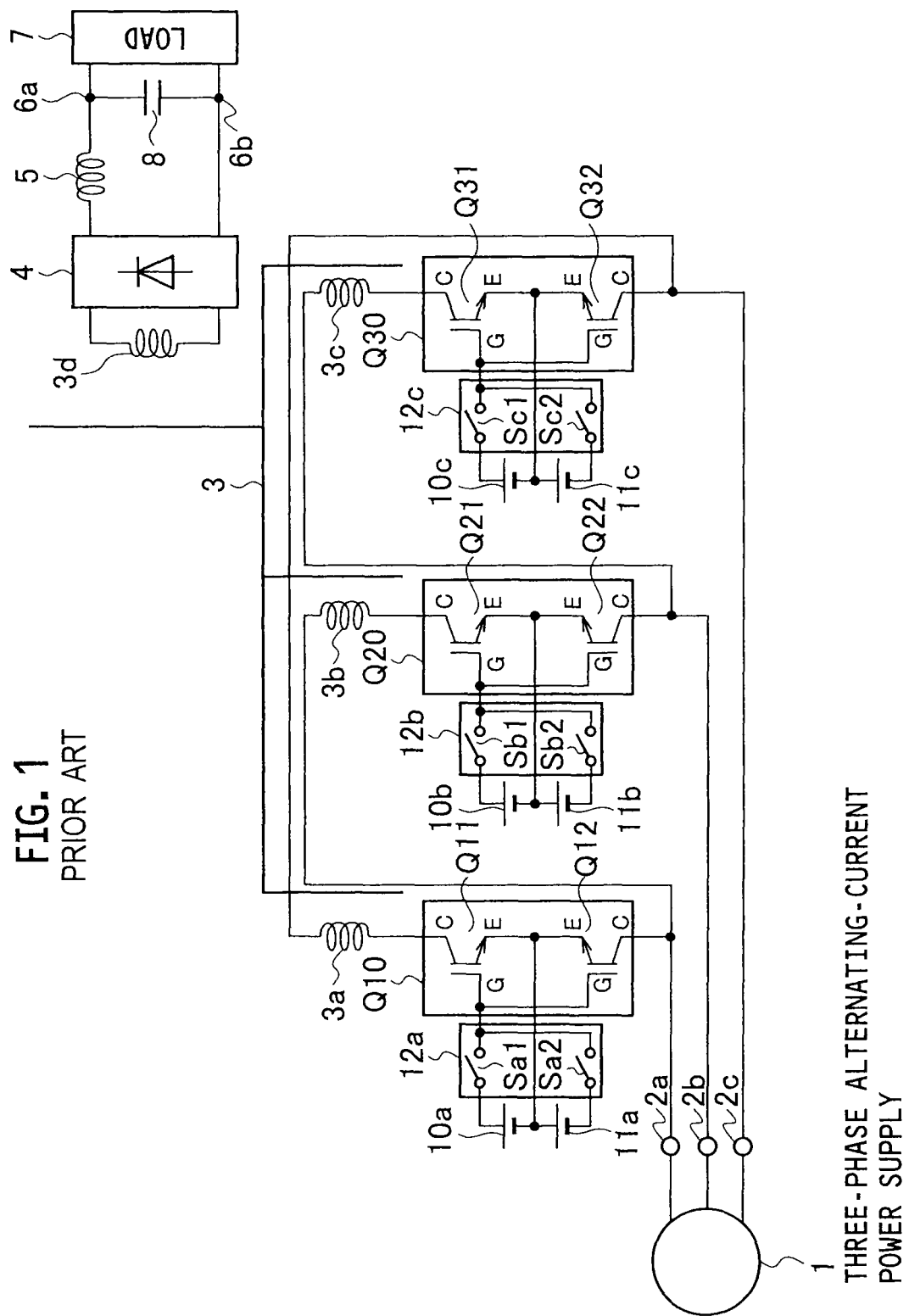
FIG. 1 is a circuit diagram showing an example of a conventional AC-DC converter device.
Figure 2:
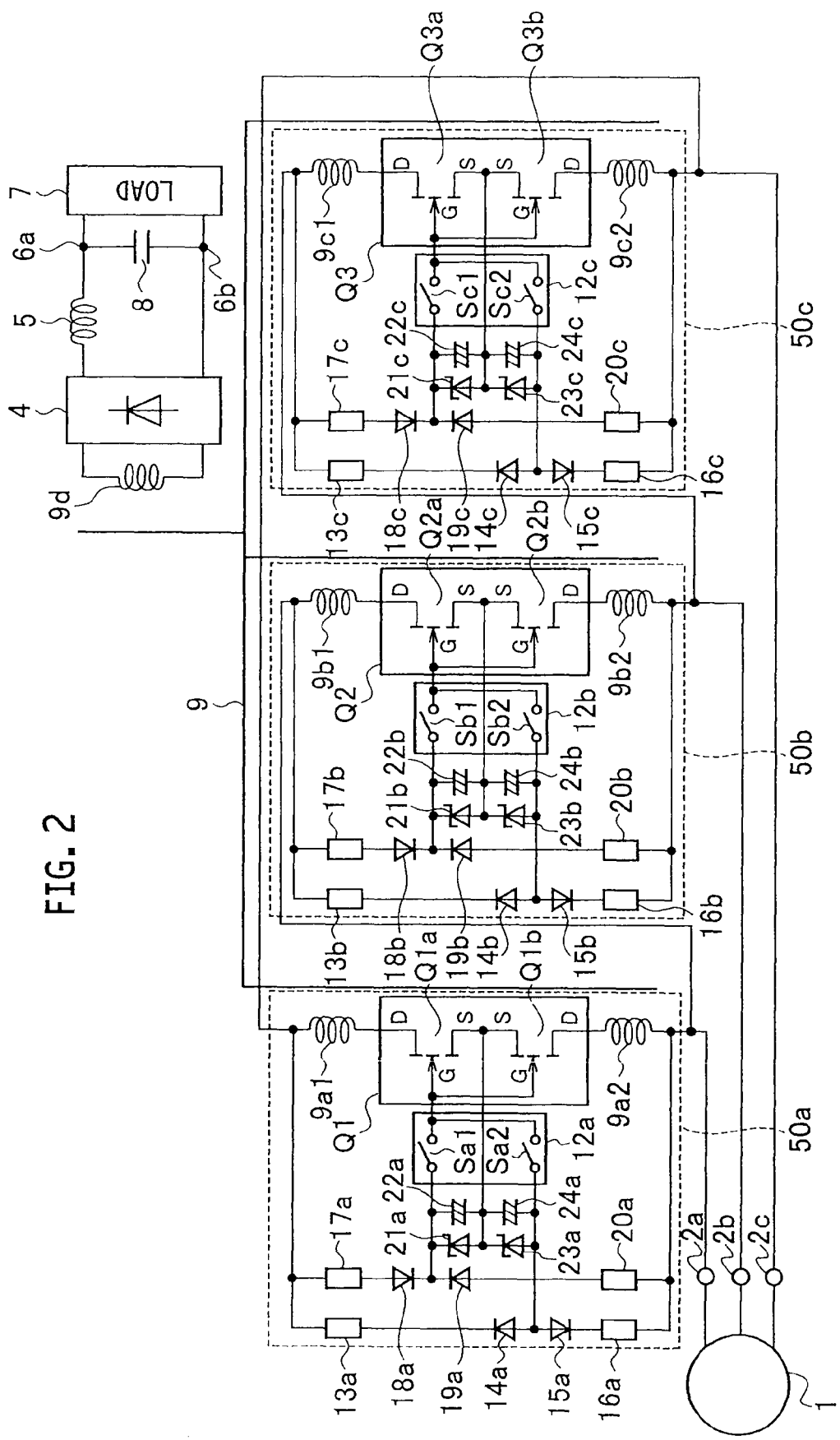
FIG. 2 is a circuit diagram showing an AC-DC converter device according to a first embodiment.

FIG. 2 is a circuit diagram showing an AC-DC converter device according to a first embodiment. The AC-DC converter device of the first embodiment shown in FIG. 2 has the following different features from the conventional AC-DC converter device shown in FIG. 1. Note that the first embodiment will describe the AC-DC converter device of a three-phase type (R phase, S phase, and T phase).

A transformer 9 includes a first primary winding 9a1 and a second primary winding 9a2 which are connected in series between an alternating-current terminal 2a and an alternating-current terminal 2c, a first primary winding 9b1 and a second primary winding 9b2 which are connected in series between the alternating-current terminal 2a and an alternating-current terminal 2b, a first primary winding 9c1 and a second primary winding 9c2 which are connected in series between the alternating-current terminal 2b and the alternating-current terminal 2c, and a secondary winding 9d.

A bidirectional switch Q1 made of a semiconductor switching element (such as GaN) is formed of a series circuit in which a source (one of main terminals) of a high electron mobility transistor (HEMT) Q1a and a source of a HEMT Q1b are connected in common. A bidirectional switch Q2 is formed of a series circuit in which a source of a HEMT Q2a and a source of a HEMT Q2b are connected in common. A bidirectional switch Q3 is formed of a series circuit in which a source of a HEMT Q3a and a source of a HEMT Q3b are connected in common. Each HEMT is made of wide band gap semiconductor such as gallium nitride (GaN) or silicon carbide (SiC). Here, the sources of the HEMTs Q1a and Q1b, the HEMTs Q2a and Q2b, and the HEMTs Q3a and Q3b are reference potential points of the bidirectional switches Q1, Q2, and Q3, respectively.

Although the HEMT is used as the bidirectional switch in the first embodiment, it is also possible to use an IGBT (isolated gate bipolar transistor), a MOSFET (metal-oxide-semiconductor Field-effect transistor), a JFET (junction gate field-effect transistor), and the like instead of the HEMT.

The first primary winding 9a1 of the transformer 9, the bidirectional switch Q1, and the second primary winding 9a2 of the transformer 9 are connected in series in this order and constitute a first series circuit. An end of the first primary winding 9a1 of the transformer 9 is connected to the alternating-current terminal 2c while an end of the second primary winding 9a2 of the transformer 9 is connected to the alternating-current terminal 2a.

The first primary winding 9b1 of the transformer 9, the bidirectional switch Q2, and the second primary winding 9b2 of the transformer 9 are connected in series in this order and constitute a second series circuit. An end of the first primary winding 9b1 of the transformer 9 is connected to the alternating-current terminal 2a while an end of the second primary winding 9b2 of the transformer 9 is connected to the alternating-current terminal 2b.

The first primary winding 9c1 of the transformer 9, the bidirectional switch Q3, and the second primary winding 9c2 of the transformer 9 are connected in series in this order and constitute a third series circuit. An end of the first primary winding 9c1 of the transformer 9 is connected to the alternating-current terminal 2b while an end of the second primary winding 9c2 of the transformer 9 is connected to the alternating-current terminal 2c.

An end of each of the first primary windings 9a1, 9b1, and 9c1 of the transformer 9 is connected to an end of each of resistors 13a, 13b, and 13c and to an end of each of resistors 17a, 17b, and 17c. An end of each of the first primary windings 9a2, 9b2, and 9c2 of the transformer 9 is connected to an end of each of resistors 16a, 16b, and 16c and to an end of each of resistors 20a, 20b, and 20c. Another end of each of the 13a, 13b, and 13c is connected to a cathode of each of diodes 14a, 14b, and 14c.

An anode of each of the diodes 14a, 14b, and 14c is connected to an anode of each of diodes 15a, 15b, and 15c, to an anode of each of zener diodes 23a, 23b, and 23c, to an end or each of capacitors 24a, 24b, and 24c, and to an end of each of switches Sa2, Sb2, and Sc2. A cathode of each of the diodes 15a, 15b, and 15c is connected to another end of each of the resistors 16a, 16b, and 16c.

Another end of each of the 17a, 17b, and 17c is connected to an anode of each of diodes 18a, 18b, and 18c. A cathode of each of the diodes 18a, 18b, and 18c is connected to a cathode of each of diodes 19a, 19b, and 19c, to a cathode of each of zener diodes 21a, 21b, and 21c, to an end or each of capacitors 22a, 22b, and 22c, and to an end of each of switches Sa1, Sb1, and Sc1.

An anode of each of the zener diodes 21a, 21b, and 21c, another end of each of the capacitors 22a, 22b, and 22c, a cathode of each of the zener diodes 23a, 23b, and 23c, and another end of each of the capacitors 24a, 24b, and 24c are connected to the source of each of the HEMTs Q1a, Q2a, and Q3a and to the source of each of the HEMTs Q1b, Q2b, and Q3b. Another end of each of the switches Sa1, Sb1, and Sc1 and another end of each of the switches Sa2, Sb2, and Sc2 are connected to a gate (a control terminal) of each of the HEMTs Q1a, Q2a, and Q3a and to a gate (a control terminal) of each of the HEMTs Q1b, Q2b, and Q3b.

The resistors 13a, 16a, 17a, and 20a, the diodes 14a, 15a, 18a, and 19a, the zener diodes 21a and 23a, and the capacitors 22a and 24a collectively constitute a first drive circuit power supply generating circuit configured to generate a direct-current positive voltage and a direct-current negative voltage out of an alternating-current power supply voltage (a line voltage using the R phase and the T phase) of the three-phase alternating-current power supply 1. The gate drive circuit 12a turns the bidirectional switch Q1 on and off by applying the direct-current positive voltage and the direct-current negative voltage from the first drive circuit power supply generating circuit to a gate of the bidirectional switch Q1.

The resistors 13b, 16b, 17b, and 20b, the diodes 14b, 15b, 18b, and 19b, the zener diodes 21b and 23b, and the capacitors 22b and 24b collectively constitute a second drive circuit power supply generating circuit configured to generate a direct-current positive voltage and a direct-current negative voltage out of an alternating-current power supply voltage (a line voltage using the R phase and the S phase) of the three-phase alternating-current power supply 1. The gate drive circuit 12b turns the bidirectional switch Q2 on and off by applying the direct-current positive voltage and the direct-current negative voltage from the second drive circuit power supply generating circuit to a gate of the bidirectional switch Q2.

The resistors 13c, 16c, 17c, and 20c, the diodes 14c, 15c, 18c, and 19c, the zener diodes 21c and 23c, and the capacitors 22c and 24c collectively constitute a third drive circuit power supply generating circuit configured to generate a direct-current positive voltage and a direct-current negative voltage out of an alternating-current power supply voltage (a line voltage using the R phase and the T phase) of the three-phase alternating-current power supply 1. The gate drive circuit 12c turns the bidirectional switch Q3 on and off by applying the direct-current positive voltage and the direct-current negative voltage from the third drive circuit power supply generating circuit to a gate of the bidirectional switch Q3.

Next, an operation of the thus configured AC-DC converter device according to the first embodiment will be described.

First, the alternating-current power supply voltage is applied from the three-phase alternating-current power supply 1, via the alternating-current terminals 2a to 2c, to the first series circuit formed of the first primary winding 9a1 of the transformer 9, the bidirectional switch Q1, and the second primary winding 9a2 of the transformer 9, to the second series circuit formed of the first primary winding 9b1 of the transformer 9, the bidirectional switch Q2, and the second primary winding 9b2 of the transformer 9, and to the third series circuit formed of the first primary winding 9c1 of the transformer 9, the bidirectional switch Q3, and the second primary winding 9c2 of the transformer 9.

Then, the alternating-current power supply voltage from the three-phase alternating current power supply 1 is rectified by the diode 18a (19a) via the resistor 17a (20a) between the alternating-current terminal 2a and the alternating-current terminal 2c, whereby the capacitor 22a obtains the direct-current positive voltage. Meanwhile, the alternating-current power supply voltage is rectified by the diode 14a (15a) via the resistor 13a (16), whereby the capacitor 24 obtains the direct-current negative voltage. The capacitor 22a obtains the direct-current positive voltage such that an upper end functions as the anode while a lower end functions as the cathode.

The capacitor 24a obtains the direct-current negative voltage such that an upper end functions as the anode while a lower end functions as the cathode. Here, the lower end of the capacitor 22a and the upper end of the capacitor 24a are the reference potential points of the first drive circuit power supply generating circuit.

Therefore, as the switch Sa1 is turned on the direct-current positive voltage is applied from the capacitor 22a to the gates of the HEMTs Q1a and Q1b, thereby turning the HEMTs Q1a and Q1b on. On the other hand, as the switch Sa2 is turned on the direct-current negative voltage is applied from the capacitor 24a to the gates of the HEMTs Q1a and Q1b, thereby turning the HEMTs Q1a and Q1b off.

Here, the primary side circuit of the transformer 9 between the alternating-current terminal 2a and the alternating-current terminal 2b and the primary side circuit of the transformer 9 between the alternating-current terminal 2b and the alternating-current terminal 2c are also operated similarly to the primary side circuit of the transformer 9 between the alternating-current terminal 2a and the alternating-current terminal 2c, and the description thereof will be omitted.

As described above, according to the AC-DC converter device of the first embodiment, even when the alternating-current power supply voltage is applied to the series circuits formed by connecting in series the first primary windings 9a1, 9b1, and 9c1 of the transformer 9, the bidirectional switches Q1, Q2, and Q3, and the second primary windings 9a2, 9b2, and 9c2 of the transformer 9 in this order, and is also applied to the drive circuit power supply generating circuits configured to generate the positive and negative power supplies for the drive circuits 12a, 12b, and 12c configured to perform on-off drive of the bidirectional switches Q1, Q2, and Q3, the potential of each of the reference potential points is set to midpoint potential of the alternating-current power supply voltage irrespective of the polarity of the alternating-current power supply voltage because the reference potential points of the bidirectional switches Q1, Q2, and Q3 are connected to the reference potential points of the drive circuit power supply generating circuits. Therefore, it is possible to supply the direct-current power by using the non-isolated simple circuits.

Second Embodiment

Figure 3:
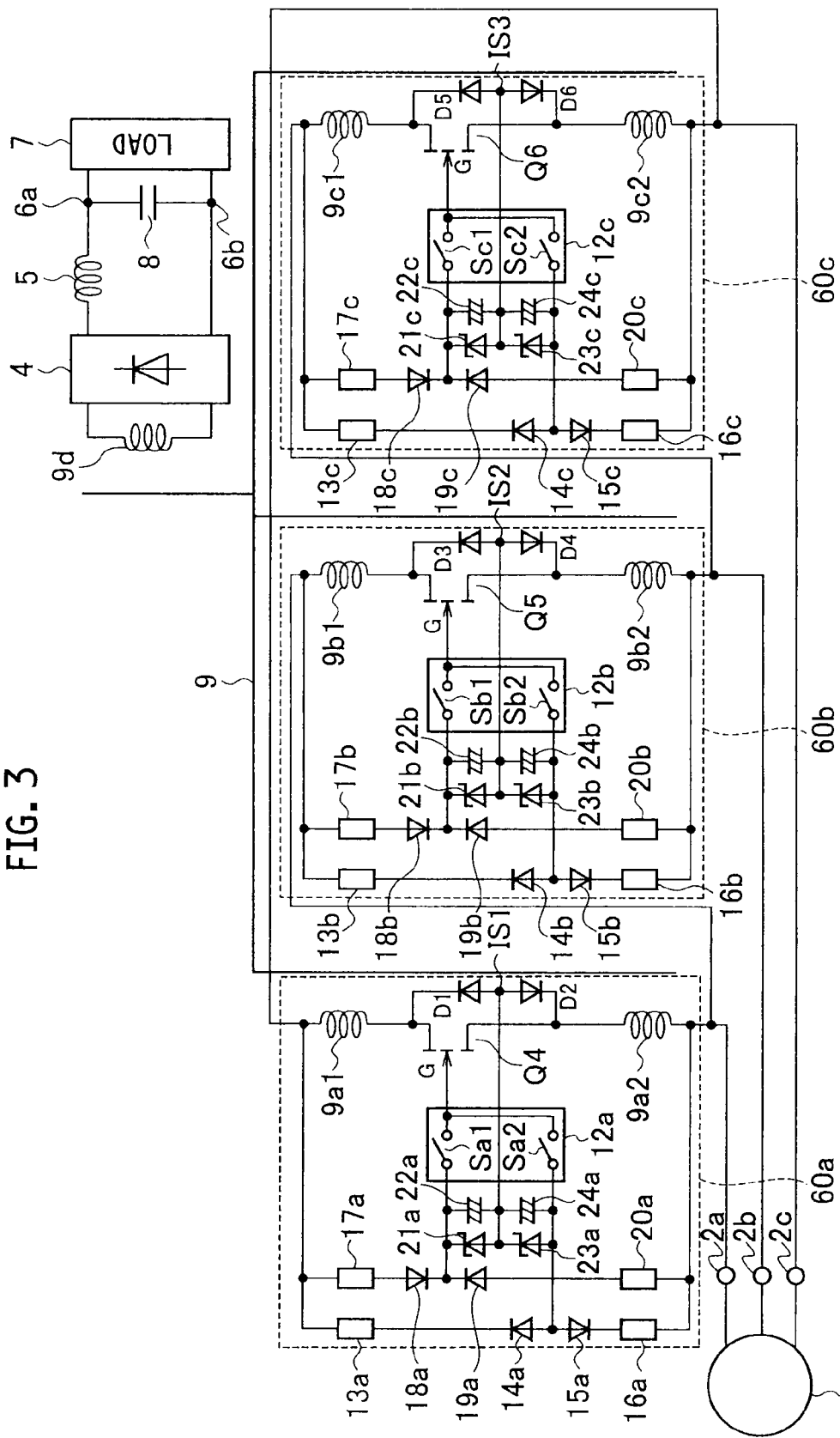
FIG. 3 is a circuit diagram showing an AC-DC converter device according to a second embodiment.

FIG. 3 is a circuit diagram showing an AC-DC converter device according to a second embodiment. The AC-DC converter device according to the first embodiment shown in FIG. 2 applies the bidirectional switches Q1 to Q3 each of which includes the two semiconductor switching elements formed by connecting in series the two HEMTs serving as unidirectional switches.

On the other hand, an AC-DC converter device of a second embodiment shown in FIG. 3 uses HEMTs Q4 to Q6, each of which includes a single semiconductor switching element, as bidirectional switches.

Other features of this embodiment are the same as the configuration shown in FIG. 2. Accordingly, the same constituents are designated by the same reference numerals and description thereof will be omitted.

The HEMTs Q4, Q5, and Q6 serving as the bidirectional switches have gates G, drains D, and sources S. Cathodes of diodes D1, D3, and D5 are connected to the drains D while anodes of the diodes D1, D3, and D5 and anodes of diodes D2, D4, and D6 are connected in common. These connecting points constitute virtual sources IS1, IS2, and IS3 and reference potential points of the bidirectional switches Q4 to Q6 at the same time. Each of these virtual sources IS1, IS2, and IS3 is connected to each of connecting points between the capacitor 22a, 22b or 22c and the capacitor 24a, 24b or 24c, to each of the anodes of the zener diodes 21a, 21b, and 21c, and to each of the cathodes of the zener diodes 23a, 23b, and 23c. Cathodes of the diodes D2, D4, and D6 are connected to the sources S of the HEMT Q4, Q5, and Q6 serving as the bidirectional switches.

As described above, the AC-DC converter device of the second embodiment is operated similarly to the AC-DC converter device of the first embodiment and achieves a similar effect even by use of the HEMTs Q4 to Q6 which function as the bidirectional switches. Moreover, the HEMT Q4, Q5 or Q6 serving as the bidirectional switch is the single semiconductor switching element and is therefore available at a low price.

It is to be noted that the present invention will not be limited only to the AC-DC converter devices of the first and second embodiments. Although the AC-DC converter devices of the first and second embodiments describe the AC-DC converter devices connected to the three-phase alternating-current power supply, the present invention is also applicable to an AC-DC converter device connected to a single-phase alternating-current power supply. First switching circuits 50a and 60a shown in FIG. 2 and FIG. 3 are only used in this case, and second switching circuits 50b and 60b and third switching circuits 50c and 60c shown therein may be deleted.

As described above, according to the present invention, even when the alternating-current power supply voltage is applied to the series circuit formed by connecting in series the first primary winding of the transformer, the bidirectional switch, and the second primary winding of the transformer in this order and to the drive circuit power supply generating circuit configured to generate the positive and negative power supplies for the drive circuit configured to perform on-off drive of the bidirectional switch, the potential of each of the reference potential points is set to midpoint potential of the alternating-current power supply voltage irrespective of the polarity of the alternating-current power supply voltage because the reference potential point of the bidirectional switch is connected to the reference potential point of the drive circuit power supply generating circuit. Therefore, it is possible to supply the direct-current power by using non-isolated simple circuits.

The present invention is applicable to a communication direct-current power supply or the like.

What is claimed is:

1. An alternating current-direct current converter device configured to cause a current to intermittently flow on a primary winding of a transformer by switching a switching circuit connected to a middle point of each power supply line of a three-phase alternating-current power supply, to rectify and smooth a voltage generated on a secondary winding of the transformer, and to output the voltage to a load,
   wherein the transformer including two primary windings for each respective phase of the three phase alternating current power supply,
   the switching circuit comprising:
       a series circuit connected to each interphase of the three-phase alternating current power supply, the series circuit including a first primary winding of the transformer, a bidirectional switch, and a second primary winding of the transformer, the first primary winding being connected to one main terminal of the bidirectional switch, the second primary winding being connected to a further main terminal of the bidirectional switch and a current of a same phase as the bidirectional switch flow;
       a drive circuit power supply generating circuit which generates a direct-current positive voltage and a direct-current negative voltage by use of an alternating-current power supply voltage applied thereto, both of the direct-current positive voltage and direct-current of negative voltage being un-isolated with respect to the alternating current power supply, the alternating current power supply voltage being applied from the middle point of the power supply line between two ends of the series circuit; and
       a drive circuit which applies the direct current positive voltage and the direct current negative voltage generated by the drive circuit power supply generating circuit to a control terminal of the bidirectional switch, and which performs on-off drive of the bidirectional switch, and
   wherein
       the bidirectional switch includes two semiconductor switching elements connected in series,
       one main terminal of the respective two semiconductor switching elements are connected to each other; and
       a connecting point between the one main terminal of the respective two semiconductor switching elements is a common reference potential point of two control terminals of the bidirectional switch, and
       the reference potential point of the bidirectional switch is connected to a common reference potential point of the direct current positive voltage and the direct current negative voltage generated by drive circuit power supply generating circuit.

2. An alternating current-direct current converter device configured to cause a current to intermittently flow on a primary winding of a transformer by switching a switching circuit connected to a middle point of each power supply line of a three-phase alternating-current power supply, to rectify and smooth a voltage generated on a secondary winding of the transformer, and to output the voltage to a load, wherein
   the transformer including two primary windings for each respective phase of the three phase alternating current power supply,
   the switching circuit comprising:
       a series circuit connected to each interphase of the three-phase alternating current power supply, the series circuit including a first primary winding of the transformer, the first primary winding being connected to one main terminal of a bidirectional switch, the second primary winding being connected to a further main terminal of the bidirectional switch and a current of a same phase as the bidirectional switch flow;
       a drive circuit power supply generating circuit which generates a direct-current positive voltage and a direct-current negative voltage by use of an alternating current power supply voltage applied thereto, both of the direct-current positive and direct-current negative voltage being un-isolated with respect to the alternating current power supply, the alternating current power supply voltage being applied from the middle point of the power supply line between two ends of the series circuit; and
       a drive circuit which providing the direct current positive voltage and the direct current negative voltage generated by the drive circuit power supply generating circuit to a control terminal of the bidirectional switch, and which performs on-off drive of the bidirectional switch,
   wherein
       the bidirectional switch includes a semiconductor element including one main terminal a further main terminal and a control terminal, a cathode of a first diode is connected to the one main terminal of the semiconductor element, a cathode of a second diode is connected to the further main terminal, an anode of the first diode is connected to an anode of the second diode, a connecting point which the anode of the first diode is connected to the anode of the second diode is a common reference potential point of a control terminals of the bidirectional switch, and the reference potential point of the bidirectional switch is connected to a common reference potential point of the direct current positive voltage and the direct current negative voltage generated by the drive circuit power supply generating circuit.

* * * * *